July 21, 1964 P. TENENBAUM ETAL 3,141,697
SMOOTH SKIN TRAILER
Filed Sept. 17, 1962 2 Sheets-Sheet 2

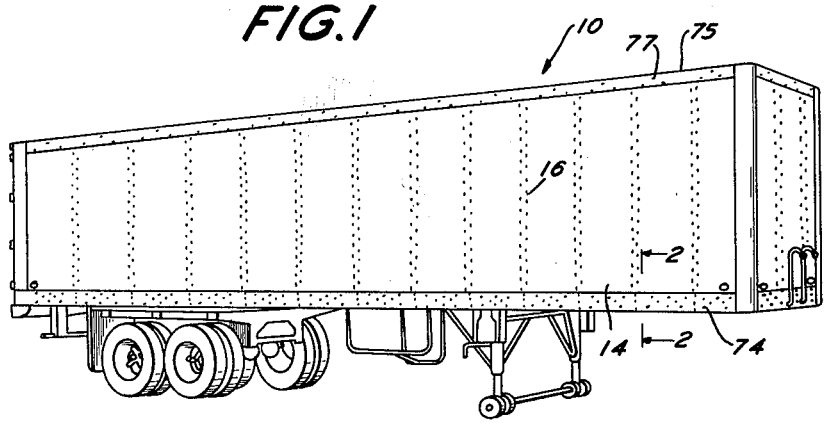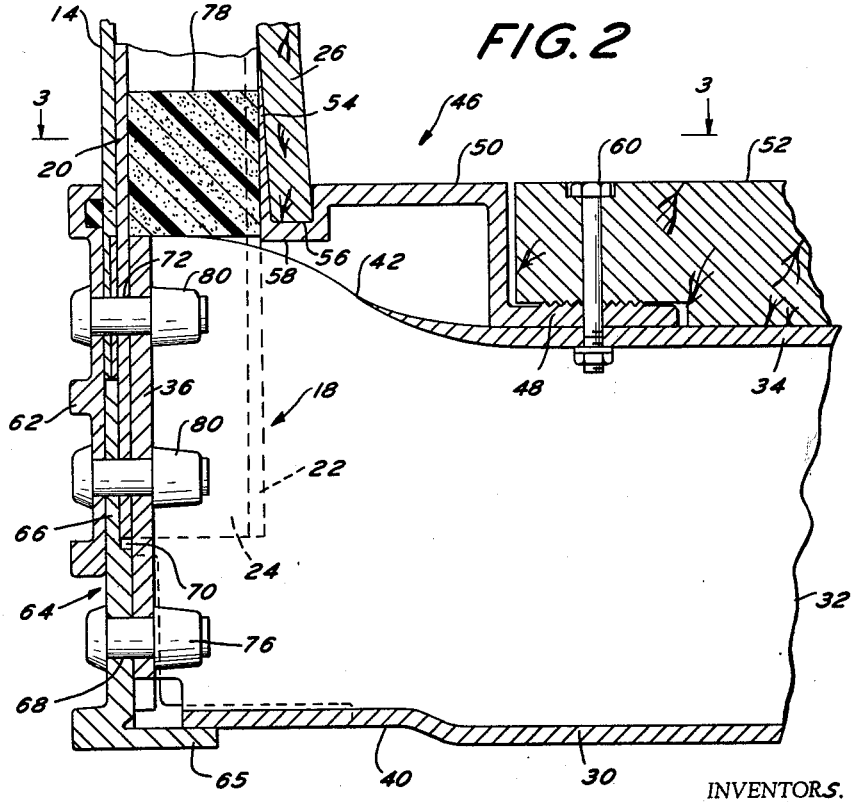

INVENTORS.
PAUL TENENBAUM
CHARLES I. BOHLEN
SEMOND LEVITT
BY Millman and Jacobs
ATTORNEY

United States Patent Office 3,141,697
Patented July 21, 1964

3,141,697
SMOOTH SKIN TRAILER
Paul Tenenbaum, Glenside, Charles I. Bohlen, Doylestown, and Semond Levitt, Huntingdon Valley, Pa., assignors to Strick Trailers, Philadelphia, Pa., a Division of Fruehauf Trailer Co., a corporation of Michigan
Filed Sept. 17, 1962, Ser. No. 224,143
10 Claims. (Cl. 296—28)

This invention relates to trailer bodies in which the skin is supported on the outside of longitudinally spaced vertical posts and known in the art as smooth skin trailers.

The primary object of this invention is to provide a smooth skin trailer with increased racking stiffness due to direct connection between the floor supporting cross sills, the posts and the side rail on both sides of the body.

A particular feature of the invention is the provision in a smooth skin trailer body construction of the character above described of a side rail which is made in two pieces, one pre-assembled to the side panels and posts and the other to the floor sills, thereby providing the manufacturing advantage of enabling the complete floor with cross sills and fifth wheel to be pre-assembled in one jig as well as ready handling and connection of all of the parts in the final assembly of the body.

Another feature of the invention is a novel cross sill which is particularly well adapted for the dual purpose of supporting the floor boards and readily being connected directly to the skin-supporting posts.

Another feature of the invention is a novel inner member which is particularly well adapted for connection to the floor-supporting cross sills and for supporting the lower ends of the inner liners.

Another object of the invention is to provide a smooth skin trailer body construction which is provided with a means which is easily assembled in the space between the outer skin and the inner liner to prevent road dirt from working its way into this space from below the vehicle.

Yet another object of this invention is to provide a smooth skin trailer which is considerably stronger than those heretofore manufactured, yet is relatively easy to make and assemble.

These and other objects and features of the invention will become more apparent as the following description proceeds in conjunction with the accompanying drawings, wherein:

FIG. 1 is a perspective view of a smooth skin trailer embodying the instant invention;

FIG. 2 is an enlarged sectional view taken on the line 2—2 of FIG. 1;

Specific reference is now made to the drawing in which similar reference characters are used for corresponding elements throughout.

Figure 3:
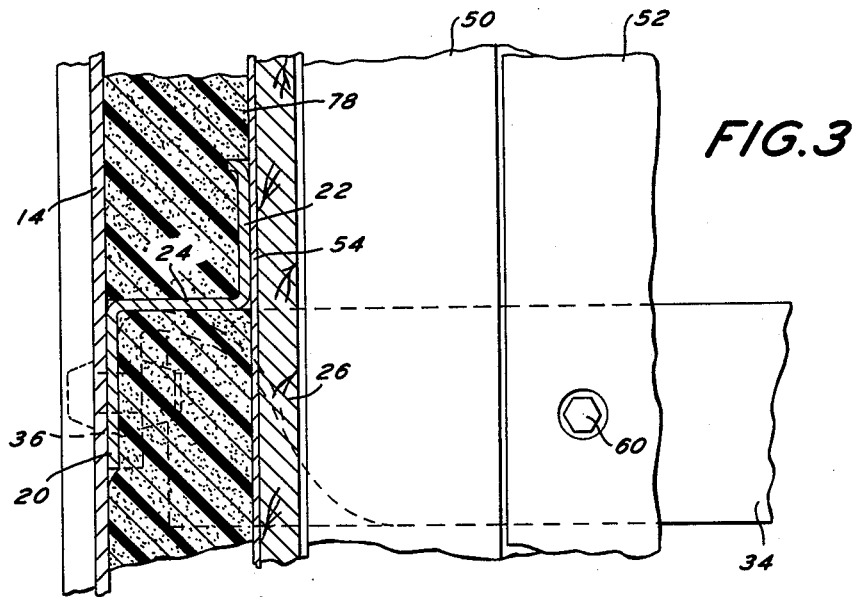
FIG. 3 is a sectional view taken on the line 3—3 of FIG. 2.

Indicated at 10 is a smooth skin trailer whose outer skin comprises a plurality of metallic or plastic panels 14 which are secured as by rivets 16 to inner vertical posts 18. While the posts may be constructed of various contours, the preferred form for particular application to the instant invention is a substantial Z-shape having an outer flange 20, an inner flange 22, and an intermediate web 24, the skin panels abutting and being secured to the outer flange 20 whereas the panels of the inner liners 26, generally of plywood, are secured by appropriate means (not shown) to the inner flange 22.

Extending transversely of the body and spaced longitudinally to conform with the spacing of the posts 18 are novel cross sills 28, each of which is substantially of channel shape and includes a lower horizontal flange 30, an intermediate vertical web 32, an upper generally horizontal flange 34, and end vertical flanges 36 with pre-formed apertures 38, the end flanges extending in planes perpendicular to that of the web 32 and between the upper and lower flanges. It will be noted that at its ends, the lower flange 30 is recessed as at 40, and the upper flange 34 at its ends is twisted as at 42 to provide substantially flat corner ledges 44 at the junctures of the upper flange 34 and the vertical end flanges 36, which ledges are elevated relative to the remaining portion of the upper flange 34 so that each end flange 36 will be lengthened to allow for sufficient spacing between the apertures 38 whereby bolts or rivets therethrough will securely fasten the cross sills to the posts and side rail members.

Extending longitudinally of the body on both sides thereof and inwardly of the posts are adapter members 46 in the form preferably of metallic extrusion pieces of step cross section, the same including a horizontal flange portion 48 abutting the upper flange 34 of the cross sill, an adjacent elevated portion 50 of height substantially equal to the thickness of the floor boards 52, and a vertical tapered flange 54 abutting the inner flanges 22 of the posts and being connected to the elevated portion 50 by a groove 56 receiving the lower ends of the inner liner panels 26. The lower surface 58 of the extrusion member 46 beneath the groove 56 is in horizontal alignment with the generally flat corners 44 of the cross sills. The floor boards 52 are secured by appropriate bolts (not shown) upon the upper flange 34 of the cross sills, one of which boards is cut out to receive the flange 48 of the adapter, there being bolts and nuts 60 securing one of the floor boards, flange 48 of the adapter, and upper flange 34 of the cross sills together.

Coming now to FIG. 2, it will be seen that a side rail at the bottom of the trailer is provided on each side thereof consisting of two pieces running the length of the body, one 62 which is vertical and can be considered an outer piece, the other 64, an inner piece. The inner piece includes a lower horizontal flange 65 extending in the recessed portions 40 of the lower flange 30 of the cross sills 28 and a vertical flange 66 with pre-formed apertures 68 therethrough conforming to the vertical spacing of the apertures 38 in the end flanges of the cross sills. The inner wall of the vertical flange 66 is recessed as at 70 to accommodate the outer flanges 20 of the posts which at their lower ends are provided with a pair of pre-formed apertures 72 spaced conformably with those of the upper two apertures 38.

In use and assembly, the outer side rail members 62 and the skins 14 are preassembled by riveting them together between the locations of the posts as at 74. The upper rail 75 may also be riveted to the skin as at 77 to lend rigidity to the entire side unit. Also, the posts are secured in place, preferably at 12-inch centers, via the rivets 16 passing through the outer flanges 20 of the posts. The cross sills 28 and inner side rail members 64 are preassembled by riveting them together as at 76. Then the adapter members 46 and floor boards are secured in place on the cross sills. Before the inner panels 26 are positioned in the grooves 56, a substantially rectangular resilient block 78, preferably of foam plastic and somewhat wider then the space between the skin 14 and the vertical flange 54 of the adapter member 46, is forced into said space to the point where it rests upon the substantially flat corner ledges 44. Lengthwise, each resilient closure block extends between the webs 24 of adjacent posts and completely fills the space therebetween. Then the outer side rail member 62 with attached skin and posts is positioned against the inner side rail member 64 and after the pre-formed holes in the inner and outer side rail members, the skin, the flanges 20, and the apertures 38 of the cross sills are aligned, the rivets 80 are passed therethrough to secure together the side rail members, the outer skin, the posts, and the cross sills. In the final construction, the closure blocks 78 serve to prevent dirt and debris below the trailer body from entering the space between the outer skin and the inner liner.

Figure 4:
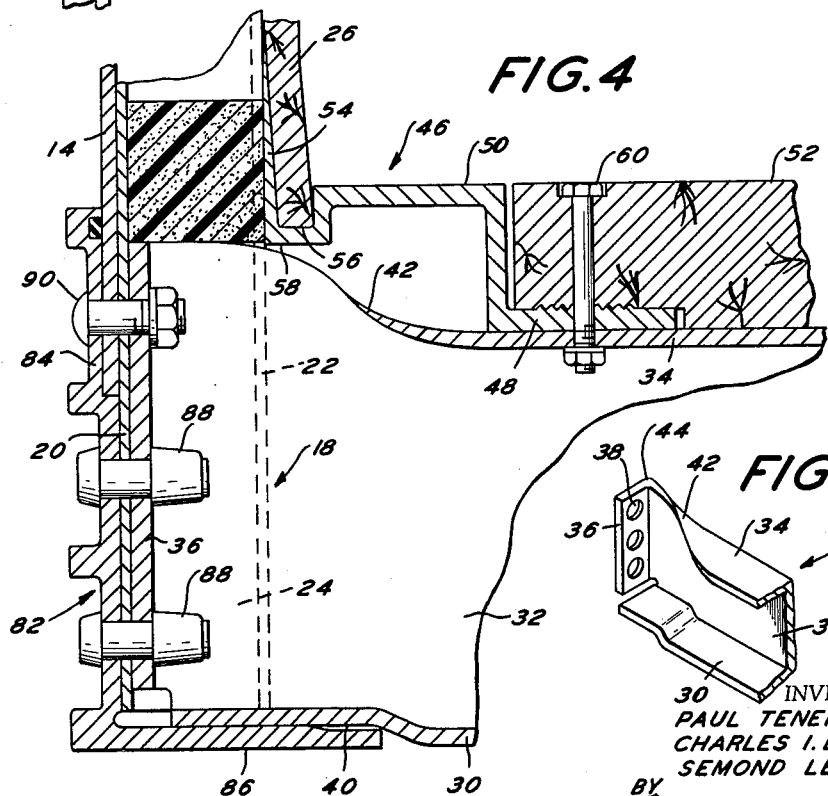
FIG. 4 is a sectional view similar to FIG. 2 of a modified form of the invention.
Figure 5:
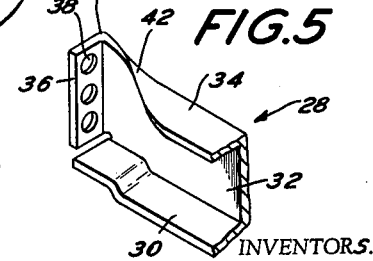
FIG. 5 is a fragmentary perspective view of a cross sill.

The unit shown in FIG. 4 differs from that of FIG. 2 only in that the side rail member 82 is of one piece having a vertical flange 84 and a horizontal flange 86 which is received in the recess 40 of the lower flange 30 of the cross sill. Rivets 88 secure together the side rail flange 84, the inner flange 20 of the posts and the end flanges 36 of the cross sills, while rivets or bolts and nuts 90 secure together these members plus the outer skin 14.

While preferred embodiments of the invention have been shown and described, skilled artisans may make minor variations without departing from the spirit of the invention and the scope of the appended claims.

What is claimed is:

1. A vehicle body comprising vertical posts spaced along both sides thereof, side skins secured to the outer faces of said posts, cross sills extending transversely between opposing pairs of posts, each cross sill having an upper horizontal flange adapted to support floor boards and end vertical flanges adjacent to said posts, side rails each having a portion longitudinally adjacent to each skin and means securing together said side rail, said skin, said post and said cross sill through said end vertical flanges thereof, each side rail including a first vertical member secured to the outer face of said side skin and a second member having a vertical flange secured to said end vertical flanges of said cross sills, a portion of said side skin and of said posts extending side by side below said upper flanges of said cross sill and adjacent said first and second side rail members, said securing means including elongated headed members extending through said first side rail member, said portions of said side skin and said posts and said end flanges of said cross sills.

2. A vehicle body comprising vertical posts spaced along both sides thereof, side skins secured to the outer faces of said posts, cross sills extending transversely between opposing pairs of posts, each cross sill having an upper horizontal flange and end vertical flanges adjacent to said posts, a longitudinal adapter on each side of the vehicle having a vertical portion abutting the inner faces of said posts and a horizontally extending portion abutting said upper flanges of said cross sills, said horizontally extending portion including a groove, liners received in said grooves and secured to said inner faces of said posts, floor boards secured upon said upper flanges of said cross sills, means securing together said horizontally extending portion of said adapter, one of said floor boards and said upper flanges of said cross sills, side rails and means securing together each side rail, skin, post and vertical end flange of said cross sills.

3. The vehicle body of claim 2 and a resilient closure member press fit between said skin and said vertical portion of said adapter and between adjacent posts.

4. A vehicle body comprising vertical posts spaced along both sides thereof, side skins secured to the outer faces of said posts, cross sills extending transversely between opposing pairs of posts, said cross sill having an upper horizontal flange adapted to support floor boards, liners secured to the inner faces of said posts, a closure member positioned in the space between said skin, said liner and adjacent posts and resting upon said upper flanges of said cross sills at their ends, and means securing together each skin, post, and corresponding end of said cross sills said closure member being a resilient block removably positioned in said space, said resilient block being somewhat larger when relaxed than said space to provide a tight fit when pressed thereinto.

5. In a vehicle body, vertical posts spaced along both sides thereof, side skins secured to the outer faces of said posts, cross sills extending transversely between opposing pairs of posts, each cross sill having an upper horizontal flange, a longitudinal adapter on each side of the vehicle having a vertical portion abutting the inner faces of said posts and a horizontally extending portion abutting said upper flanges of said cross sills, said horizontally extending portion including a groove, liners received in said grooves and secured to said inner faces of said posts, floor boards secured upon said upper flanges of said cross sills, means securing together said horizontally extending portion of said adapter, one of said floor boards and said upper flanges of said cross sills.

6. The vehicle body of claim 5 and a resilient closure member press fit between said skin and said vertical portion of said adapter and resting upon said upper flanges of said cross sills at its ends.

7. A vehicle body comprising vertical substantially Z-shaped posts spaced along both sides thereof, each post having inner and outer flanges connected by a web, side skins each secured to the outer faces of said outer flanges of said posts, cross sills extending between corresponding opposed posts, each cross sill having vertical flanges at their ends adjacent to the said inner faces of said outer flanges of said posts, side rails each having a vertical portion adjacent to the outer faces of said skins, means including elongated headed members extending through and securing together said rail, said outer flanges of said posts and said vertical flanges of said cross sills, and liners secured to said inner flanges of said posts.

8. The vehicle body of claim 7 and a resilient closure block press fit between said skins and said liners and between the said webs of adjacent posts.

9. A vehicle body comprising vertical substantially Z-shaped posts spaced along both sides thereof, each post having inner and outer flanges connected by a web, side skins each secured to the outer faces of said outer flanges of said posts, cross sills extending between corresponding opposed posts, each cross sill having vertical flanges at their ends adjacent to the said inner faces of said outer flanges of said posts, side rails each having a vertical portion adjacent to the outer faces of said skins, and means including elongated headed members extending through and securing together said rail, said outer flanges of said posts and said vertical flanges of said cross sills.

10. A vehicle body comprising vertical posts spaced along both sides thereof, side skins secured to the outer faces of said posts, cross sills extending transversely between opposing pairs of posts, each cross sill having an upper horizontal flange adapted to support floor boards and end vertical flanges adjacent said posts, side rails each having a longitudinal portion adjacent each skin, each post including a lower portion extending below said upper flange of said cross sill and interposed between said longitudinal portion of said side rail and said end vertical flange of said cross sill and elongated headed members extending through and securing together said longitudinal portion of said side rail, said lower portion of said post and said end vertical flange of said cross sill.

References Cited in the file of this patent
UNITED STATES PATENTS

| | | |
|---|---|---|
| 2,502,703 | Chaplin | Apr. 4, 1950 |
| 2,578,052 | Evanoff et al. | Dec. 11, 1951 |
| 2,812,973 | Pritchard | Nov. 12, 1957 |
| 2,991,116 | Andrews | July 4, 1961 |
| 3,027,187 | Rivers | Mar. 27, 1962 |

FOREIGN PATENTS

| | | |
|---|---|---|
| 527,543 | Great Britain | Oct. 10, 1940 |
| 162,164 | Sweden | Feb. 11, 1958 |